July 10, 1928.

G. C. TAYLOR 1,676,935

POWER PLANT

Filed July 30, 1925

3 Sheets-Sheet 2

WITNESSES:

G. C. Taylor
INVENTOR

BY

ATTORNEY

July 10, 1928.

G. C. TAYLOR 1,676,935

POWER PLANT

Filed July 30, 1925   3 Sheets-Sheet 3

WITNESSES:

G. C. Taylor
INVENTOR

BY
ATTORNEY

Patented July 10, 1928.

1,676,935

UNITED STATES PATENT OFFICE.

GEORGE C. TAYLOR, OF PHILADELPHIA, PENNSYLVANIA, ASSIGNOR TO WESTINGHOUSE ELECTRIC & MANUFACTURING COMPANY, A CORPORATION OF PENNSYLVANIA.

POWER PLANT.

Application filed July 30, 1925. Serial No. 46,993.

My invention relates to power plants, particularly to power plants in which only a portion of the total power required, as determined by the process steam requirements, is normally produced in the plant and in which the remaining power required is obtained from some outside source, and it has for an object to provide a power plant of the character designated which shall operate with the highest degree of efficiency and reliability and which shall have embodied therein provision for automatically increasing the power output of the plant coincident with the failure of the outside source of supply.

Figure 1:
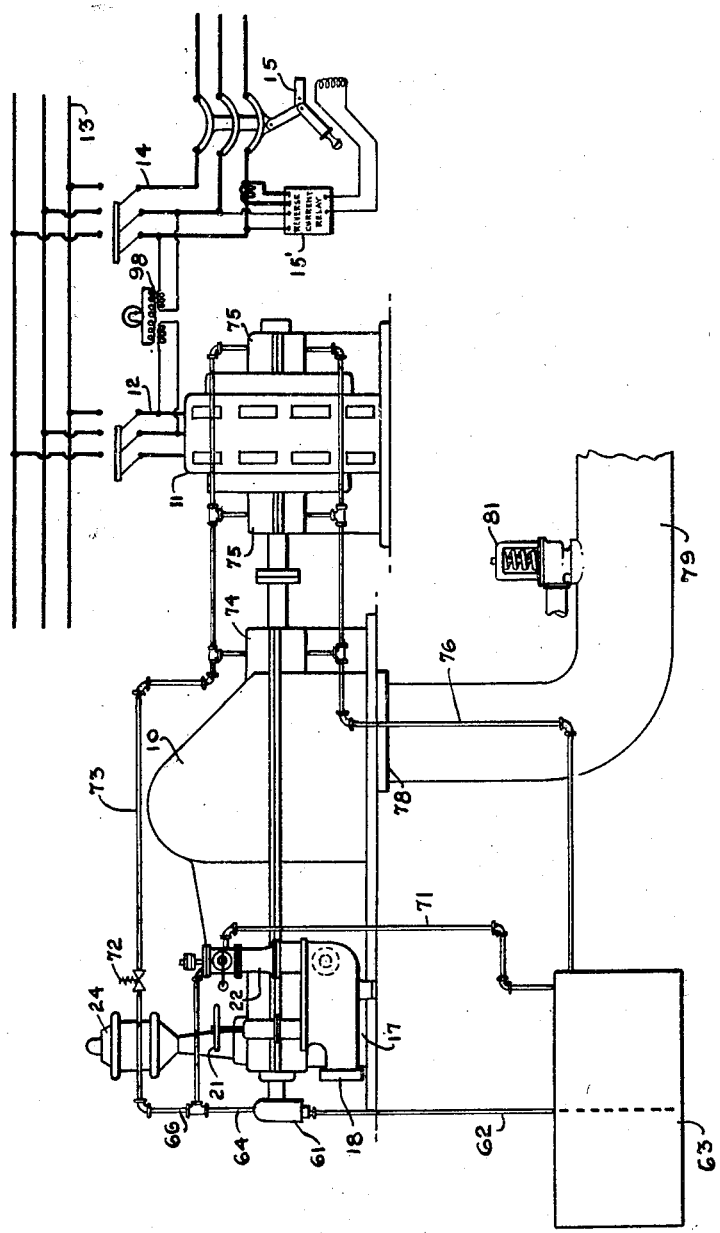
Figure 2:
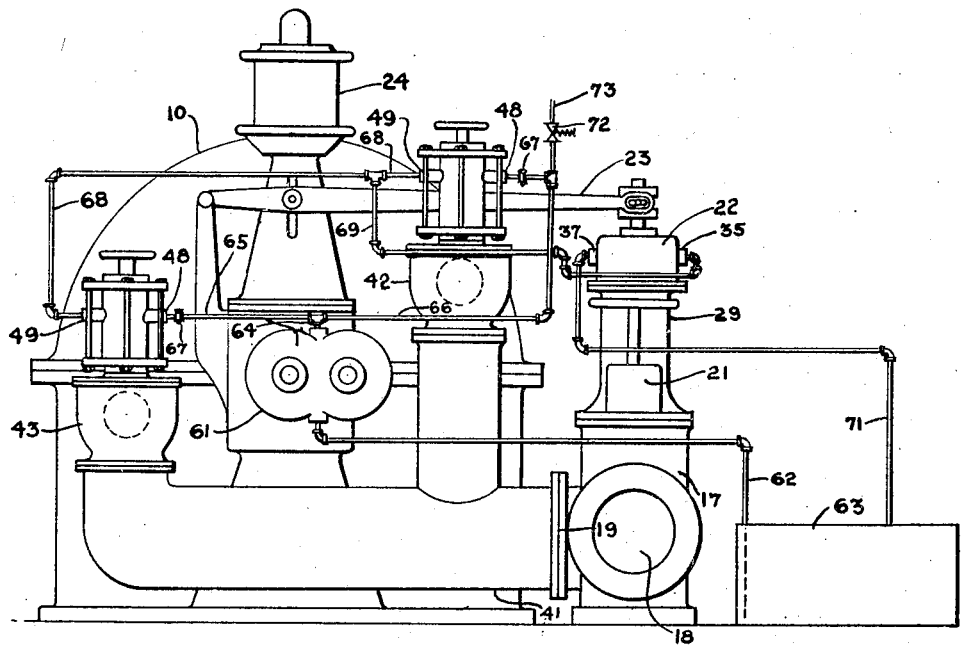
Figure 5:
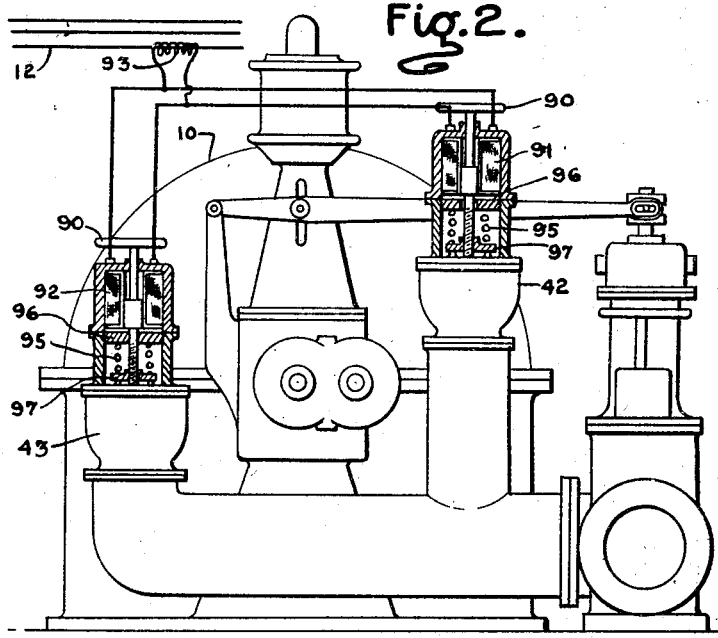
Figure 4:
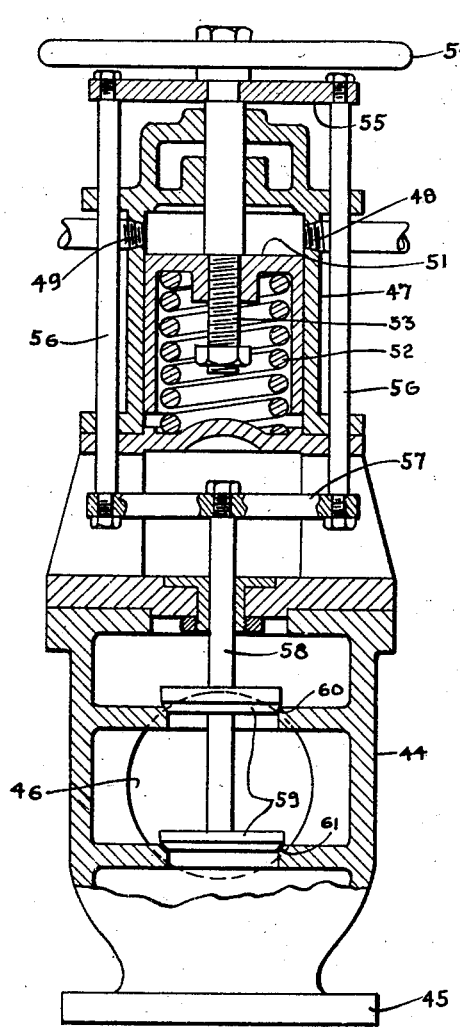
Figure 3:
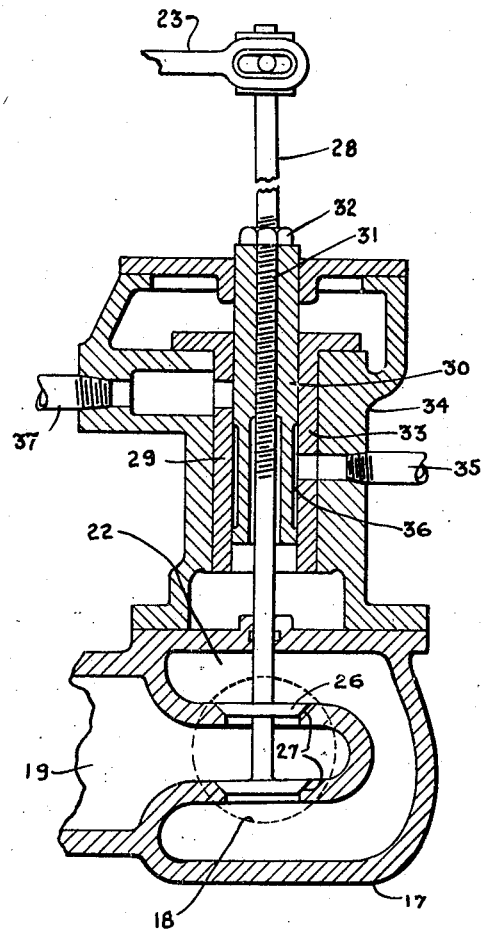

These and other objects, which will be made apparent throughout the further description of my invention, may be attained by the employment of the apparatus hereinafter described and illustrated in the accompanying drawings in which Fig. 1 is a view, in elevation, of one form of power plant arranged in accordance with my invention; Fig. 2 is a transverse view, in elevation, of the turbine shown in Fig. 1; Fig. 3 is a view, in sectional elevation, of the governor valve associated with the turbine; Fig. 4 is a view, in sectional elevation, of the primary and secondary admission valves associated with the turbine; and Fig. 5 is a view, partly in section and partly in elevation, of another form of control system which I may employ for actuating the primary and secondary admission valves.

In numerous industrial plants, the amount of electrical energy consumed is relatively large while the amount of exhaust steam required for process work is relatively small and it may therefore be advisable, in the interest of operating economy, to generate in the industrial plant only such electrical energy as will make available the required amount of process or exhaust steam, and to obtain the remainder of the electrical energy from some outside source such, for example, as a central power station of the hydro-electric type. In numerous industrial enterprises, such as paper manufacturing, it is very desirable that the electrical load be maintained continuously as any interruptions in the supply of electrical energy, no matter how slight, may result in serious injury to the product which is at that time in the course of manufacture.

I have therefore conceived the idea of providing a turbo-generator having two or more admission valves associated with the turbine and which normally operates with only a sufficient number of admission valves in an open position to produce the required amount of exhaust or process steam. This turbo-generator therefore carries only a portion of the entire electrical load, the remaining portion being sustained by some outside generating plant of relatively large capacity. Such operating conditions are obviously the best from an economic standpoint. However, as the outside source of power may fail momentarily, I associate with the governor mechanism of the turbine suitable control apparatus which, coincident with the failure of the outside source of power, opens additional admission valves of the turbine, permitting the plant turbo-generator to carry, temporarily, substantially all of the electrical load. At such times, an excessive amount of exhaust or process steam is produced, the excess being discharged to the atmosphere or to some form of apparatus in the power plant through a suitable relief valve. Upon the restoration of the outside source of power, it may be again connected to the power plant as soon as proper synchronous relations are established, whereupon the control apparatus is so arranged that it automatically closes all but those admission valves required to effect the required amount of exhaust or process steam.

Referring to the drawings for a more detailed description of my invention, I show in Fig. 1 a turbine 10 for driving a generator 11 which is connected through suitable leads 12 to bus bars 13. Also connected to the bus bars 13 are leads 14 for supplying electrical energy thereto from some outside source such as a central station hydro-electric plant. A suitable circuit breaker 15 is provided in the leads 14, the trip coil of which is connected to be energized through a reverse power relay 15' as is well known in the art.

As shown in Figs. 1, 2 and 3, the turbine is provided with a suitable steam chest 17 having an inlet connection 18 and an outlet connection 19. Provided in the steam chest 17 are a throttle valve 21 and a governor valve 22. The valve 22 is actuated through a lever 23 by a governor 24, which may be any one of many well-known types.

As shown in Fig. 3, the governor valve 22 is provided with a balanced valve disc 26 which cooperates with a multiple balanced valve seat 27 provided in the steam chest 17. The valve disc 26 is connected to the lever 23 of the governor by means of a suitable valve stem 28 and associated with the valve stem 28 is a governor-controlled pressure relief valve 29. The latter includes a piston valve 30 which is adjustably secured to the valve stem 28 by means of screw threads 31 and a lock nut 32. The piston valve 30 moves in a valve casing 33 which is secured in a fluid-tight housing 34. The housing 34 is provided with a fluid pressure inlet 35 which communicates at all times with a port or annular recess 36 provided in the piston valve 30. The housing 34 is also provided with an outlet 37 which, under normal conditions of operation, fails to communicate with the port 36.

As shown in Fig. 2, the steam chest 17 connects, through a manifold 41, with a primary admission valve 42 and a secondary admission valve 43 for supplying motive fluid to the turbine. Both of these valves are of similar construction and, as illustrated in Fig. 4, comprise a valve body 44 having an inlet 45 and an outlet 46. Supported upon the valve body 44 is a cylinder 47 which is provided at its upper end with a fluid inlet 48 and a fluid outlet 49. Disposed within the cylinder 47 is a piston 51 which is biased toward the uper end of the cylinder by a compression spring 52. Threaded in the piston 51 is a piston rod 53 which may be rotated by a hand wheel 54. The piston rod 53 is shouldered in a yoke 55 which is connected through standards 56—56 with a lower yoke 57 which in turn is connected through a valve stem 58 with a valve 59 preferably of the balanced type. The standards 56 are slidably disposed in the flanges of the cylinder 47. Valve seats 60 and 61 are provided in the valve body 44 and cooperate with the valve 59 to control the flow of steam to the turbine.

As shown in Figs. 1 and 2, the turbine 10 is provided with a fluid translating device, such as a gear pump 61, which is preferably driven from the turbine shaft although it is obvious that this pump may be independently driven. The gear pump 61 communicates, through a suction conduit 62, with an oil reservoir 63. It discharges through a conduit 64 and branch conduits 65 and 66, with the respective inlet connections 48 of the primary and secondary admission valves 42 and 43. Provided in each of the branch conduits 65 and 66 is some suitable means for restricting the flow of fluid therethrough, such as an orifice 67. The discharge connections 49 of the primary and secondary admission valves are connected through conduits 68 and 69 with the inlet 35 of the governor controlled pressure relief valve 29, while the outlet connection 37 of the governor controlled pressure relief valve connects through a conduit 71 with the reservoir 63.

The discharge conduit 66 of the pump 61 is provided with a relief valve 72 having its outlet connected through a conduit 73 to bearings 74 and 75 provided in the turbine and generator respectively for supplying lubricating fluid thereto. Oil removed from the bearings drains by gravity through a conduit 76 to the reservoir 63.

The turbine 10 is provided with an exhaust connection 78 to which is connected a conduit 79 for distributing the exhaust steam utilized in process work. Associated with the conduit 79 is a relief valve 81 for discharging excess fluid pressure to the atmosphere.

The operation of the above embodiment of my invention is as follows: Under normal conditions of operation, the primary admission valve 42 of the turbine 10 is manually opened by means of its associated hand wheel 54 while the secondary admission valve 43 remains closed. Steam is supplied to the inlet connection 18 of the steam chest 17 and passes through the throttle valve 21, the governor valve 22, the manifold 41 and the primary admission valve 42, to the turbine. Steam exhausted from the turbine is conveyed by means of the conduit 79 to various portions of the plant to be utilized in various industrial processes. The amount of motive steam admitted to the turbine by the governor 24 is only such as will make available the exact amount of process steam required in the exhaust conduit 79. The electrical energy developed by the generator 11 is therefore dependent upon the process steam requirements and generally the electrical energy thus produced is insufficient to meet the total plant demand. The output of the generator 11 is augmented, however, by power supplied through the leads 14 to the main buses 13, the latter power being preferably purchased from some large central station at a relatively low cost.

During normal operation, the pump 61 withdraws oil from the reservoir 63 and discharges it through the conduit 64 at a pressure of, for example, 60 pounds per square inch. This oil pressure is transmitted through the branch conduits 65 and 66 to the respective cylinders 47 of the primary and secondary admission valves 42 and 43 and thence through the conduit 68 and 69 to the inlet 35 of the governor control pressure relief valve 29. Under normal conditions of operation, the piston valve 30 of the valve 29 remains in substantially the position illustrated with respect to the casing 33, normal movements of the governor 24 not being sufficiently extensive to connect the inlet 35 with the outlet 37. As a consequence, the full pressure developed by the pump 61 is maintained in the upper end of the respective cylinders 47 of the primary and secondary admission valves 42 and 43.

In the case of the primary valve 42, which is normally retained in an open position, the valve disc 59 is moved, by means of the hand wheel 54, from its seats 60 and 61, the piston rod 53 moving upwardly through the piston 51 which is retained in the position illustrated by the fluid pressures. As the valve is wide open, failure of the fluid pressure cannot affect its position. However, should it be desired to so manipulate the hand wheel 53 so as to only partially open the valve, fluid pressure in the upper end of the cylinder, under normal conditions of operation, overcomes the force exerted by the spring 52 and prevents further opening. However, in the case of the secondary valve 43, in which the handwheel 43 is adjusted to a closed position, the fluid pressure acts upon the piston 51 to overcome the force exerted by the compression spring 52, thereby retaining the piston 51 in the lower end of the cylinder 47 and the valve disc 59 in fluid-tight engagement with its seats 60 and 61.

The oil discharged by the pump 61 is also conveyed to the relief valve 72 which discharges oil through the conduit 73 to the various bearings 74 and 75 for lubricating the same. The pressure of the oil in the conduit 73 is determined by the resistance to flow encountered in its passage through the bearings and the piping and is usually about five pounds per square inch. As there is no flow of oil through the respective cylinders 47 of the primary and secondary admission valves 42 and 43, the relief valve is always open as long as the pump 61 is driven by the turbine, so that an adequate supply of oil to the bearings is at all times assured. Oil discharged from the bearings is drained through the conduit 76 to the reservoir 63 after which it may be again utilized in the system.

It sometimes happens that the current supplied from an outside source through the leads 14 to the main buses 13 may fail temporarily and, although it may return in a relatively short time, the conditions for proper synchronous operation are, in general, absent. It is therefore advisable at such times to synchronize the generator 11 with the incoming power as by a synchronizing lamp 98, whereupon the outside source of power may be again connected to the main buses. In the meantime, however, it is highly desirable, in numerous industrial establishments such as paper mills, etc., that the greater portion of the electrical load be sustained in order to avoid interruptions in the manufacturing process and consequent damage to the product.

My power plant therefore is so arranged that, upon failure of the outside current and the imposition of the entire load upon the generator 11, the turbine 10 slows down perceptibly, effecting abnormal movement of the governor 24. The governor 24 is so arranged that, at such times, it moves the valve stem 28 of the governor valve a sufficient amount, in an opening direction, to place the port 36 in communication with both the inlet 35 and the outlet 37, whereby the fluid pressure in the respective cylinders 47 of the primary and secondary admission valve 42 and 43 is relieved through the conduits 68, 69 and 71 to the reservoir 63. As a consequence, the respective compression springs 52 move the pistons 51 to the upper ends of the cylinders 47, thus opening wide the primary and secondary admission valves 42 and 43. The opening of the secondary admission valve 43 permits a very substantial quantity of additional steam to be supplied to the turbine 10 and consequently the load carried by the turbine 10 and the energy developed by the generator 11 is very materially increased. I may so design the turbine 10 and the generator 11 that, under these conditions, the turbine 10 and the generator 11 are capable of carrying any portion or the entire electrical load until such time as the outside source of power is again connected to the main buses.

As a consequence of opening the secondary admission valve 43, an excessive amount of exhaust steam is supplied to the conduit 79, the excess being discharged to the atmosphere through the relief valve 81. While the steam thus discharged to the atmosphere performs no additional work in the power plant, it is to be remembered that such a condition exists only in emergencies and that the value of the exhaust steam thus dissipated is many times compensated for by the maintenance of the electrical load and the consequent avoidance of injury to the product which is then in the course of manufacture.

While the fluid pressure is relieved from the cylinders of the primary and secondary admission valves, nevertheless the supply of fluid through the conduit 73 to the various bearings is uninterrupted inasmuch as I have provided orifices 67 in the conduits 65 and 66 so that the amount of fluid escaping through the cylinders 47 and the governor controlled pressure relief valve 29 is relatively small and the pump 61 is therefore fully capable of maintaining sufficient pressure in the discharge conduit 64 to retain the relief valve 72 in its discharge position.

Upon the outside source of power being again connected to the main buses 13, there is a consequent reduction in the load carried by the generator 11 and the governor 24 moves the governor valve 22 an abnormal amount in the direction of closing. Such movement shuts off communication between the inlet 35 and the outlet 37 of the governor controlled pressure relief valve 29, whereupon the fluid pressure is again built up in the respective cylinders 47 and moves the pistons 51 as permitted by the positions of the handwheels 54, to overcome the force exerted by the springs 52 to return the valve discs 59 toward their closing positions.

While I have described the turbine 10 as being provided with primary and secondary admission valves, it is to be understood that I may employ any number of valves as may be determined by plant requirements. Furthermore, while I have utilized oil as an actuating fluid for the primary and secondary admission valves, because such a fluid may be also utilized as a lubricant, it is obvious that many other fluids might be readily employed.

In Fig. 5 I have shown another embodiment of my invention in which the primary and secondary admission valves 42 and 43 may be adjusted by means of handwheels 90—90 in the manner heretofore described, but which are actuated electrically instead of by fluid pressure in times of emergency. In this embodiment, the valves are secured to the cores of respective solenoids 91 and 92 which are connected in parallel through a current transformer 93 to a lead 12 of the generator 11. The valves are so arranged that, upon failure of the outside source of current and a consequent sudden increase in the load carried by the generator 11, the excessive current demand upon the generator 11 greatly increases the energy of the solenoids 91 and 92, causing them to open the valve or valves against the force exerted by compression springs 95, which are held between fixed abutment 96 and a yoke 97 threaded upon the valve stem. However, upon the outside source of current being again connected to the main buses, the consequent drop in load upon the lead 12 causes the solenoids to be partially de-energized and the springs 94 and 95 return the valves to their normal operating positions.

From the foregoing it will be apparent that I have devised a novel form of power plant which is especially adapted for industrial establishments wherein steam is required for process work but in which the electrical requirements are in excess of the steam demand. I have therefore provided a turbine which is adapted to supply the required amount of steam and which incidently produces a maximum amount of electrical energy responsive to the steam demand. All other electrical energy required is furnished from some outside source at a relatively low cost and hence the normal operating costs of the plant are a minimum. However, I have associated a novel form of control mechanism with the turbine whereby, upon failure of the outside current, the plant turbo-generator incidently assumes the entire or greater portion of the electrical load until such time as the outside source of power is again available, thereby avoiding shut-downs and consequent injury to the product in its course of manufacture.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a power plant, the combination of a turbine, a motive fluid admission valve for the turbine, a governor for actuating the motive fluid admission valve, a supplementary motive fluid admission valve for the turbine, manually operated means for opening or closing the supplementary admission valve, and fluid pressure means responsive upon an abnormal decrease or increase in the speed of the turbine for opening the closed supplementary admission valve or for closing the opened supplementary admission valve.

2. In a power plant, the combination of a turbine, a motive fluid admission valve for the turbine, a governor for actuating the motive fluid admission valve, a series of supplementary motive fluid admission valves for the turbine, said valves being biased to an open position, independent means for opening and closing the respective supplementary admission valves, fluid pressure means for retaining at least one of the supplementary admission valves in a closed position, and a valve mechanism actuated by the governor upon an abnormal decrease in speed for relieving the fluid pressure, whereby the closed supplementary admission valves are permitted to open, or, upon an abnormal increase in speed, for retaining the fluid pressure, whereby the opened supplementary admission valves are closed.

3. In a power plant, the combination of a prime mover, a motive fluid admission valve for the prime mover, a speed responsive device for actuating the admission valve, a series of supplementary motive fluid admission valves for the prime mover, a pump for discharging oil under pressure, means for utilizing the oil pressure to normally retain at least one of the supplementary admission valves in a closed position, means actuated by the governor and responsive to an abnormal decrease in the speed of the prime mover for relieving oil pressure from the supplementary admission valves, whereby the supplementary admission valves are permitted to open and admit additional motive fluid to the prime mover, and means for conveying lubricant discharged by the pump to the working parts of the prime mover.

4. In a power plant, the combination of a prime mover, a motive fluid admission valve for the prime mover, a speed responsive device for actuating the admission valve, a series of supplementary motive fluid admission valves for the prime mover, a pump for discharging oil at a relatively high pressure, means for utilizing the oil pressure to normally retain at least one of the supplementary admission valves in a closed position, means actuated by the governor and responsive to an abnormal decrease in the speed of the prime mover for relieving oil pressure from the closed supplementary admission valves, whereby said valves are permitted to open and admit additional motive fluid to the turbine, and means for conveying the lubricant discharged by the pump to the working parts of the turbine at a relatively lower pressure.

5. In a power plant, the combination of a turbine, a valve for normally admitting motive fluid to the turbine, a governor responsive to the speed of the turbine for controlling the movements of the admission valve, a series of supplementary motive fluid admission valves for the turbine, fluid pressure means operated by the governor for opening at least one of the motive fluid admission valves upon an abnormal increase in the load carried by the turbine, a conduit for distributing the fluid normally exhausted by the turbine for process work, and a relief valve provided in said conduit for discharging excess fluid therefrom incident to the opening of the supplementary admission valves.

In testimony whereof, I have hereunto subscribed my name this twentieth day of July, 1925.

GEORGE C. TAYLOR.